US012634571B2

(12) United States Patent
Qu et al.

(10) Patent No.: US 12,634,571 B2
(45) Date of Patent: May 19, 2026

(54) CAMERA SYSTEM FOR AERIAL MAPPING

(71) Applicant: SHANGHAI SEAGULL DIGITAL CAMERA CO., LTD, Shanghai (CN)

(72) Inventors: Jiantao Qu, Shanghai (CN); Fuqiang Dong, Shanghai (CN)

(73) Assignee: SHANGHAI SEAGULL DIGITAL CAMERA CO., LTD, Shanghai (CN)

( * ) Notice: Subject to any disclaimer, the term of this patent is extended or adjusted under 35 U.S.C. 154(b) by 0 days.

(21) Appl. No.: 18/947,896

(22) Filed: Nov. 14, 2024

(65) Prior Publication Data

US 2025/0071407 A1     Feb. 27, 2025

Related U.S. Application Data

(63) Continuation of application No. PCT/CN2023/117610, filed on Sep. 8, 2023.

(30) Foreign Application Priority Data

Mar. 3, 2023    (CN) .......................... 202310193928.5

(51) Int. Cl.
　　*H04N 23/61*　　　(2023.01)
　　*H04N 23/55*　　　(2023.01)
　　*H04N 25/76*　　　(2023.01)

(52) U.S. Cl.
　　CPC ............. *H04N 23/61* (2023.01); *H04N 23/55* (2023.01); *H04N 25/76* (2023.01)

(58) Field of Classification Search
　　CPC ........ G03B 17/12; H04N 23/61; H04N 23/00; H04N 23/55; H04N 23/60; H04N 23/73; H04N 25/76; Y02A 90/30

(Continued)

(56) References Cited

U.S. PATENT DOCUMENTS

| | | | | |
|---|---|---|---|---|
| 10,520,943 B2 * | 12/2019 | Martirosyan | .......... | G05D 1/106 |
| 2022/0245832 A1 * | 8/2022 | Gupte | .................... | G06T 7/246 |

FOREIGN PATENT DOCUMENTS

| | | | | |
|---|---|---|---|---|
| CN | 101103308 A | 1/2008 | | |
| CN | 113359263 A * | 9/2021 | ............. | H04N 23/55 |

(Continued)

OTHER PUBLICATIONS

Fusen Huang, "Operation Principle of Aperture Drive Control Circuit of Panasonic NV-M9000 camcorder And Troubleshooting Examples", Electronics World, No. 12, Dec. 1, 2005, pp. 66-67.

*Primary Examiner* — Thai Q Tran
*Assistant Examiner* — Nienru Yang

(57)　　　　　　ABSTRACT

The present invention discloses a camera system for aerial mapping which adopts inter-lens shutter. The system is equipped with DSP module, software system can be developed to realize interaction and integration between camera, drone and other integrated hardware. The system possesses strong applicability and wide range of applications. The system comprises lens, inter-lens shutter, CMOS image sensor module and DSP mainboard. The lens is used to collect image light signals. Shutter slot is provided on lens cone. Inter-lens shutter is inserted and fixed in shutter slot. CMOS image sensor module is fixedly connected to lens and is used to capture image light signal and convert it into digital image signal. DSP mainboard comprises DSP module. It is connected to CMOS image sensor module through circuit board. DSP mainboard is electrically connected to inter-lens shutter and is used to receive and process digital image signals and adjust inter-lens shutter.

8 Claims, 9 Drawing Sheets

(58) Field of Classification Search
USPC ......................................................... 348/144
See application file for complete search history.

(56)                    References Cited

FOREIGN PATENT DOCUMENTS

| CN | 215067471 U | 12/2021 |
| CN | 116366937 A | 6/2023 |
| JP | 2000249905 A | 9/2000 |
| JP | 2000307914 A | 11/2000 |

* cited by examiner

CAMERA SYSTEM FOR AERIAL MAPPING

CROSS-REFERENCE TO RELATED APPLICATIONS

This application is a continuation of International Patent Application No. PCT/CN2023/117610, filed on Sep. 8, 2023, which claims the benefit of priority from Chinese Patent Application No. 202310193928.5, filed on Mar. 3, 2023. The content of the aforementioned application, including any intervening amendments thereto, is incorporated herein by reference in its entirety.

TECHNICAL FIELD

The present invention relates to the technical field of aerial mapping and relates to a camera system for aerial mapping.

TECHNICAL BACKGROUND

Aerial mapping technology is regarded as a means of ground mapping using aircraft in the atmosphere as measuring carrier. Its mapping object is the positional relationship of ground objects, and the purpose is to draw geodetic coordinates through the data obtained from aerial photography. The method usually used is aerial photogrammetry. With the development of aviation technology represented by drones, the technology of aerial mapping has accounted for an increasingly large proportion in the field of basic mapping. With development of computers and artificial intelligence technology, application of mapping technology is no longer limited to professional fields but has increasingly become a basic technology used in a wide range of technical fields. However, as the most basic technology in the technical field of aerial mapping, the development of high-precision digital imaging technology is far behind, affecting the development of mapping technology.

At present, mapping cameras used by drones in market are basically modified from existing consumer-grade cameras such as SLR cameras or MILC cameras. Usually, the outer shell as well as some peripheral electronic and structural parts of consumer-grade cameras are removed before use, and they are called modified cameras. Consumer-grade cameras utilize rolling shutters, which are in front of the CMOS sensor and are relatively large. Moreover, the modified camera after the modification is prone to produce a jelly effect when taking pictures while the drone is in motion, affecting the accuracy of photography. Furthermore, although some electronic and structural parts are removed from modified camera, the camera itself is still a component system, and the systems are intertwined, so modification of camera will not be thorough, and there will still be redundant parts, resulting in heavy weight and large size of the camera. If the modification is not done well, the camera will work unstably.

SUMMARY OF THE INVENTION

The present invention provides a camera system for aerial mapping which adopts an inter-lens shutter and possesses compact and reliable structure. The overall system is light in weight and small in volume. In addition, the present system is equipped with DSP module, which can develop software system according to actual requirements to realize the interaction and integration between cameras, drones and other integrated hardware. It possesses strong applicability and a wide range of applications.

The technical solution adopted by the present invention is as follows:

The present invention provides a camera system for aerial mapping, comprising:

a lens for collecting the image light signals, wherein a shutter slot is provided on the lens barrel of the lens, an inter-lens shutter, wherein the inter-lens shutter is inserted and fixed in the shutter slot, a CMOS image sensor module, wherein CMOS image sensor module is connected fixedly to the lens, and is used to capture image light signal and convert the image light signal into a digital image signal, a DSP mainboard, wherein the DSP mainboard comprises DSP module, wherein the DSP mainboard is connected to CMOS image sensor module via a circuit board, and the DSP mainboard is electrically connected to the inter-lens shutter and is used to receive as well as process the digital image signal and regulate the inter-lens shutter.

Optionally, it also comprises:

a driving signal module, wherein the DSP mainboard is electrically connected to the inter-lens shutter through the driving signal module, wherein the driving signal module is used to control and process input as well as output signals of the DSP mainboard and the inter-lens shutter.

Further optionally, DSP mainboard comprises a driving signal circuit module, a storage module and a power management module, wherein the driving signal circuit module is electrically connected to driving signal module as well as DSP module respectively, and is used for triggering control processing of the signal according to the control signal sent by the DSP module, and controlling the signal output timing of the driving signal module, wherein the input end of the storage module is electrically connected to the output end of the DSP module and the driving signal circuit module respectively, and is used to store and process the data signal processed by the DSP module as well as the control signal executed by driving signal circuit module, and wherein the power management module is electrically connected to the DSP module, the driving signal circuit module as well as the storage module respectively and is used to control and process the electric current of the input as well as output power of the DSP mainboard.

Still further optionally, the driving signal circuit module also comprises a camera power-on driving circuit and a photo-trigger driving circuit, wherein the camera power-on driving circuit comprises a chip U1, an NPN transistor Q1, a PNP transistor Q2, a resistor R1, a resistor R2, a resistor R3, a resistor R4, a resistor R5 and a resistor R6, wherein one end of resistor R1 is connected to camera power-on signal, wherein the other end of resistor R1 is respectively connected to one end of resistor R2 and the base b of NPN transistor Q1, wherein the collector c of the NPN transistor Q1 is respectively connected to one end of the resistor R3 and one end of the resistor R4, wherein the other end of the resistor R4 is connected to the base b of the PNP transistor Q2, wherein the emitter e of PNP transistor Q2 is connected to the other end of the resistor R3, wherein the collector c of PNP transistor Q2 is respectively connected to one end of the resistor R6 and the pin 1 of the chip U1, wherein the both ends of the resistor R5 are respectively connected to the pin 1 and pin 2 of chip U1, wherein the other end of the resistor R2, the emitter e of NPN transistor Q1, the other end of the resistor R6 as well as the pin 3 of chip U1 are grounded, wherein the photo-trigger driving circuit comprises a chip U2, a diode D1, a resistor R7, a resistor R8, a resistor R9 and a resistor R10, wherein one end of the resistor R7 is connected to the photo-trigger signal, wherein the other end of the resistor R7 is respectively connected to one end of the resistor R8 and the pin 4 of the chip U2, wherein the other end of resistor R8 is connected to power supply voltage VCC, wherein the pin 1 of chip U2 is connected to one end of resistor R9, wherein the other end of the resistor R9 is connected to the negative electrode of the diode D1, wherein the positive electrode of the diode D1 is connected to one end of the resistor R10, wherein the other end of resistor R10 is connected to the input power supply VPWR, and wherein the pin 2 as well as pin 3 of the chip U2 are grounded.

Still further optionally, driving signal circuit module comprises an infrared filter switch driving circuit which further comprises a chip U3, a chip J1, a capacitor C1, a capacitor C2 and a capacitor C3, wherein the pin 5 of chip U3 is respectively connected to one end of capacitor C1, one end of capacitor C2 and power supply voltage VCC, wherein one end of the capacitor C3 is respectively connected to the pin 4 of the chip U3 and the pin 2 of the chip J1, wherein the other end of capacitor C3 is respectively connected to the pin 6 of chip U3 and the pin 1 of the chip J1, and wherein the pin 2 of chip U3, the other end of capacitor C1, the other end of capacitor C2 and pin 3 as well as pin 4 of chip J1 are grounded.

Still further optionally, power management module comprises power management circuit which further comprises a chip U4, a chip U5, a chip U6, a chip U7, a chip U8, chip U9, a chip U10, a capacitor C4, a capacitor C5, a capacitor C6, a capacitor C7, a capacitor C8, a capacitor C9, a capacitor C10, a capacitor C11, a capacitor C12, a capacitor C13, a capacitor C14, a capacitor C15, a capacitor C16, a capacitor C17, a capacitor C18, a capacitor C19, a capacitor C20, an inductor L1, an inductor L2, an inductor L3 and an inductor LA, wherein the chip U4 is provided with a GPIO port, wherein the pin 36 of chip U4 is respectively connected to the system power supply V_SYS and one end of the capacitor C20, wherein the pin 20 of chip U4 is respectively connected to power supply 1V8_PMC and one end of the capacitor C4, wherein the other end of capacitor C20, C4 and the pin 30 of chip U4 are grounded, wherein the pin 22 of chip U5 is connected to the system power supply V_SYS and one end of the capacitor C5 respectively, wherein pin 21 of chip U5 is connected to power supply 1V8_LPDDR4 and one end of capacitor C6 respectively, wherein the pin 23 of chip U5 is connected to one end of the capacitor C7, wherein the other end of the capacitors C5, C6 and C7 are grounded, wherein the pin 10 of chip U6 is respectively connected to the system power supply V_SYS and one end of the capacitor C8, wherein the pin 9 of chip U6 is connected to one end of capacitor C9, wherein the other end of capacitors C8, C9 and the pin 16 of chip U6 are grounded, wherein the pin 37 and pin 38 of chip U7 are respectively connected to the system power supply V_SYS, wherein pin 38 of chip U7 is connected to one end of the capacitor C10, wherein the pin 39 and pin 40 of chip U7 are respectively connected to one end of the inductor L1, wherein the other end of the inductor L1 is respectively connected to the pin 35 of chip U7, the digital voltage DVDD_MEDIA and one end of the capacitor C11 as well as capacitor C12, wherein the other end of capacitors C10, C11, C12 and pin 2 as well as pin 3 of chip U7 are grounded, wherein pin 7 of chip U8 is respectively connected to system power supply V_SYS and one end of the capacitor C13, wherein pin 6 of chip U8 is connected to one end of the inductor L2, wherein the other end of inductor L2 is respectively connected to pin 8 of chip U8, digital voltage DVDD and one end of the capacitor C14, wherein the other end of capacitors C13, C14 and pin 5 of chip U8 are grounded, wherein pin 25 of chip U9 is respectively connected to system power supply V_SYS and one end of the capacitor C15, wherein pin 26 of chip U9 is connected to one end of the inductor L3, wherein the other end of inductor L3 is respectively connected to the pin 24 of chip U9, the digital voltage DVDD_CPU and one end of the capacitors C16 and C17, wherein the other ends of the capacitors C15, C16 and C17 are connected to the pin 27 of chip U9, wherein pin 32 of chip U10 is respectively connected to the system power supply V_SYS and one end of the capacitor C18, wherein pin 31 of chip U10 is connected to one end of the inductor LA, wherein the other end of inductor LA is respectively connected to the pin 29 of chip U10, the power supply 1V1_DDR and one end of the capacitor C19, and wherein the other ends of capacitors C18 as well as C19 and the pins 28 as well as 41 of chip U10 are grounded.

Still further optionally, storage module comprises a Flash storage circuit as well as a SD card storage circuit, wherein Flash storage circuit further comprises a chip U11, a resistor R11, a resistor R12, a resistor R13, a capacitor C21 and a capacitor C22, wherein the pin 8 of chip U11 is respectively connected to power supply voltage VCC and one end of the capacitor C22, wherein the pin 6 of chip U11 is connected in series with the resistor R11, and the pin 6 of chip U11 is connected to one end of the capacitor C21, wherein the pin 7 of chip U11 is connected to one end of the resistor R12, wherein the pin 3 of chip U11 is connected to one end of the resistor R13, wherein the other end of resistors R12 and R13 are respectively connected to the power supply voltage VCC, wherein the other ends of the capacitors C21 as well as C22 and the pin 4 of chip U11 are grounded, wherein the SD card storage circuit comprises a chip J2, a resistor R14, a resistor R15, a capacitor C23, a diode D2, a diode D3, a diode D4, a diode D5, a diode D6, a diode D7, a diode D8 and a diode D9, wherein pin 5 of chip J2 is connected in series with resistor R14, wherein one end of the resistor R15 is connected to power supply voltage VCC, wherein the other end of resistor R15 is connected to pin 9 of chip J2, wherein the pin 4 of chip J2 is connected to power supply VCC_SD, wherein the capacitor C23 is connected in series with the diode D2, wherein one end of the diode D2 is connected to the pin 5 of chip J2, wherein one end of the diode D3 is connected to the pin 1 of chip J2, wherein one end of the diode D4 is connected to the pin 2 of chip J2, wherein one end of the diode D5 is connected to the pin 3 of chip J2, wherein one end of the diode D6 is connected to pin 7 of chip J2, wherein one end of the diode D7 is connected to the pin 8 of chip J2, wherein one end of the diode D8 is connected to pin 9 of the chip J2, wherein one end of the diode D9 is connected to the pin 4 of chip J2, and wherein pin 6, pin 10, pin 11, pin 12 as well as pin 13 of the chip J2 and the other ends of diode D2, diode D3, diode D4, diode D5, diode D6, diode D7, diode D8, as well as diode D9 are connected.

Still further optionally, the DSP mainboard further comprises a communication module, wherein the communication module is electrically connected to the input end of the DSP module, power management module as well as storage module respectively and is used for communicating function of DSP module.

Optionally, DSP module comprises an information statistics module, a scene recognition module and a data processing module, wherein the scene recognition module is used to receive the digital image signal sent by the CMOS image sensor module, conduct scene recognition according to the digital image signal, and adjust system parameters according to the recognized scene information, wherein the information statistics module is used to collect, count and analyze the data information of the scene recognition module, wherein the data information comprises the digital image signal, the scene information and the adjusted system parameters, and wherein the data processing module is used to receive the sensor data of the CMOS image sensor module, and the statistical information sent by the information statistics module, and run a program according to sensor data as well as statistical information to adjust the inter-lens shutter and realize functions of the lens such as photography, signal control and storage management.

Further optionally, the DSP module comprises a software development kit SDK, wherein DSP module is provided with one or more interfaces within the LCD interface, Peripheral interface, JTAG interface, TV interface and HDMI interface.

The beneficial effects of technical solutions of the present invention are as follows:

The present camera system for aerial mapping utilizes an inter-lens shutter in plug-in style, which makes it easier to replace the shutter of lens and realizes quick positioning and installation, ensuring that the overall optical path of the lens will not be affected during the shutter replacement process. The operation is simple and convenient, and the structure is compact and reliable, making the overall system light in weight and small in volume. Furthermore, the system has a built-in DSP module, which can be developed and designed by engineers according to user needs and provides an SDK software system to realize interaction as well as integration between the cameras and the drones and other integrated hardware. It has strong applicability and a wide range of applications.

DESCRIPTION OF DRAWINGS

To more clearly illustrate technical solutions in embodiments or prior art of the present invention, the accompanying drawings to be used in description of embodiments or prior art will be briefly described below. Obviously, accompanying drawings in following description are only some of embodiments of the present invention, and other accompanying drawings may be obtained based on these drawings by a person of ordinary skill in the art without creative labor.

DETAILED DESCRIPTION OF THE EMBODIMENTS

The technical solution in embodiments of present invention will be clearly and completely described below in combination with the attached drawings in embodiment of present invention. Obviously, the embodiments described are only part of the embodiments of the present invention, not all embodiments. Based on embodiments in present invention, all other embodiments obtained by those skilled in prior art without creative work belong to claimed scope of the present invention.

It should be noted that in the absence of conflict, features in embodiments of the present invention may be incorporated. The terms "include" as well as "have", and any variations thereof, are intended to cover a non-exclusive inclusion. For example, a process, method, system, product, or apparatus that includes a series of steps or units is not necessarily limited to those steps or units that are expressly listed but may include other steps or units that are not expressly listed or inherent to such process, method, product, or apparatus.

In the prior art, the modified camera was heavy and large due to incomplete modification, and it does not work stably on the drones. Furthermore, the modified camera software is solidified and cannot interact and integrate with the drones and other integrated hardware.

Figure 1:
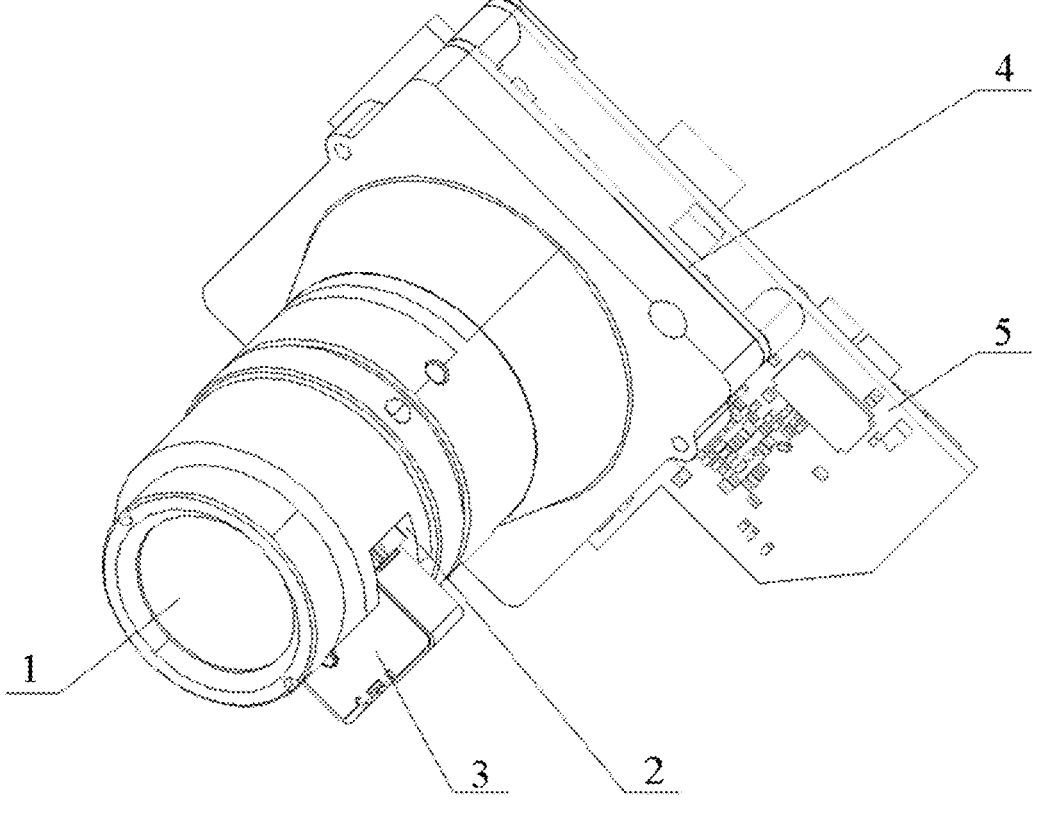
FIG. 1 shows a schematic diagram of structure of the camera system for aerial mapping provided by embodiments of the present invention.
Figure 2:
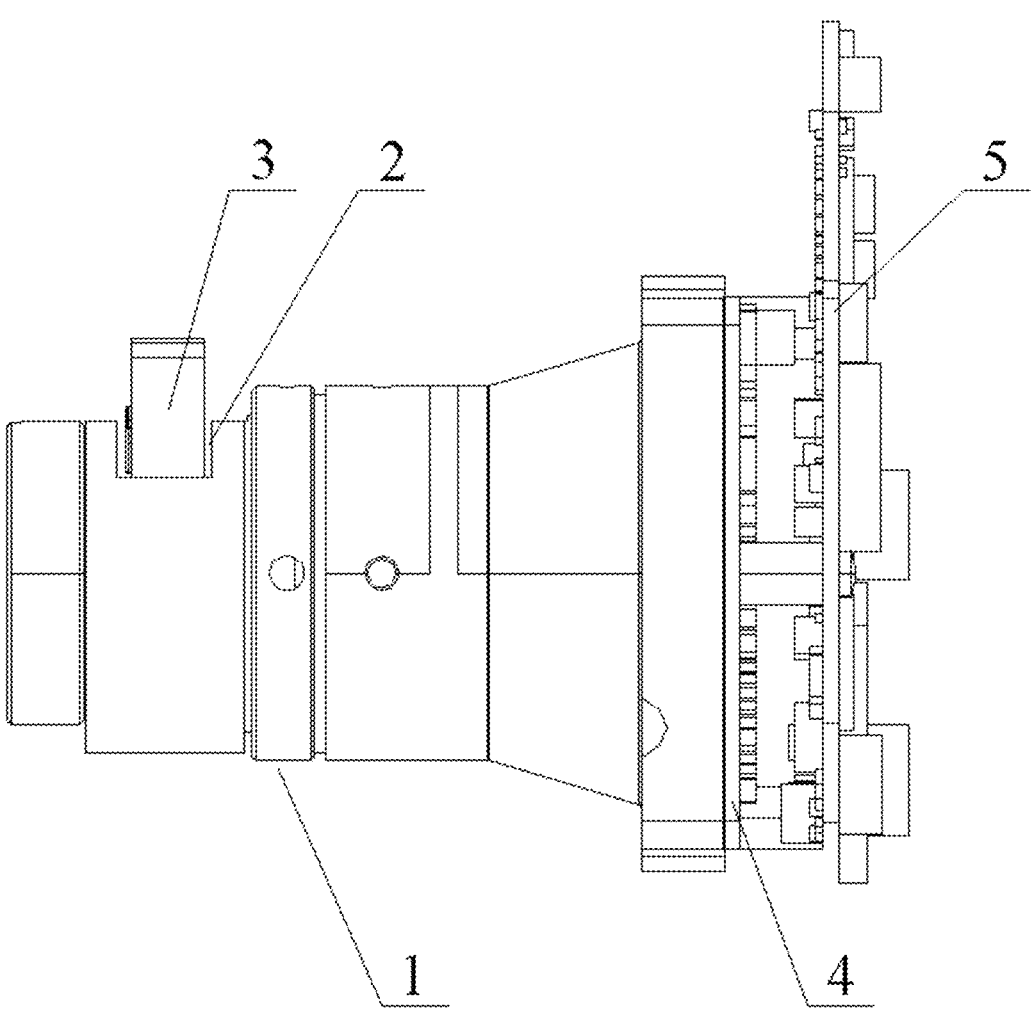
FIG. 2 shows a front view of camera system for aerial mapping provided by embodiments of the present invention.
Figure 3:
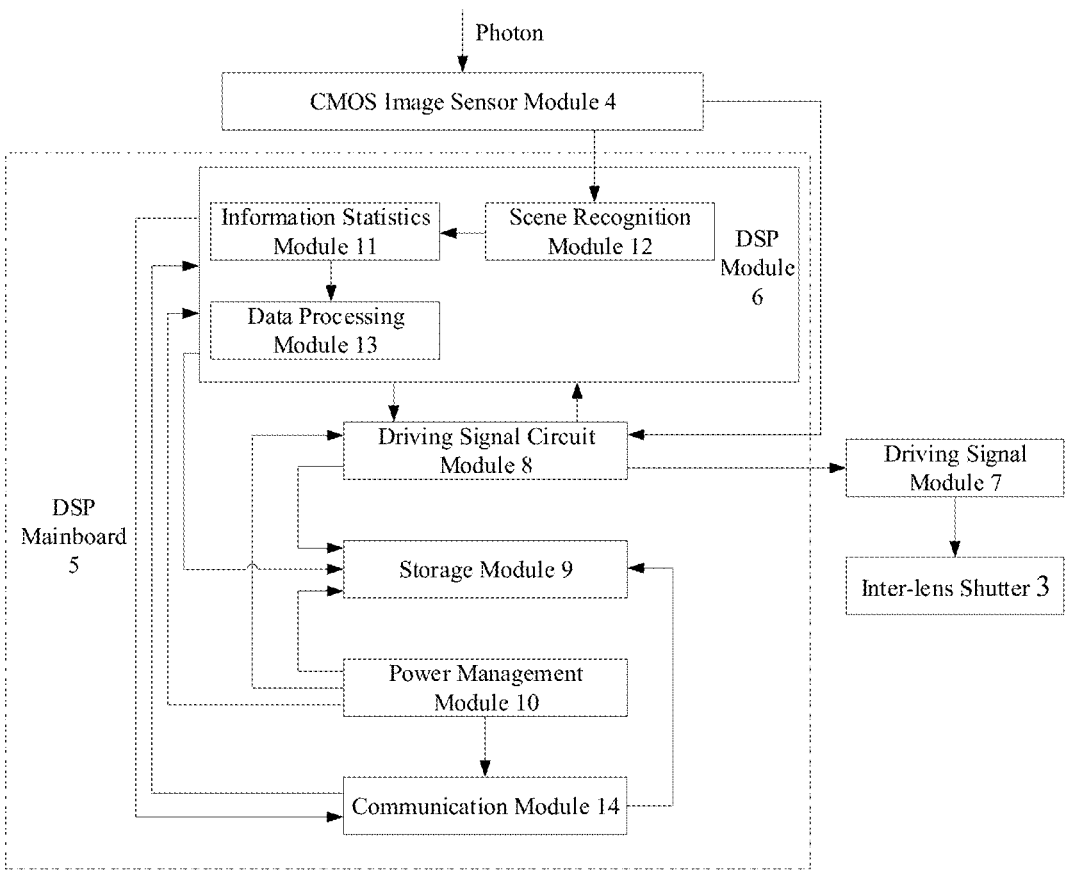
FIG. 3 shows a frame diagram of the camera system for the aerial mapping provided by embodiment of the present invention.

The present invention discloses a camera system for aerial mapping to solve at least one technical problem in prior art. Detailed description is as follows:

The drawings from FIG. 1 to FIG. 3 show the camera system for aerial mapping provided according to the embodiments of the present invention. As shown in FIG. 1 as well as FIG. 2, the camera system for the aerial mapping mainly comprises lens 1, inter-lens shutter 3, CMOS image sensor module 4 and DSP mainboard 5. Among them, in the embodiments of the present invention, camera system for aerial mapping adopts inter-lens shutter 3 which can be fixed at middle position of lens 1 by fasteners. Specifically, shutter slot 2 is provided on the lens barrel of lens 1, and inter-lens shutter 3 is inserted as well as fixed in shutter slot 2. Inter-lens shutter 3 in plug-in style makes the shutter of lens 1 easier to be replaced, and positioning structure between shutter slot 2 as well as inter-lens shutter 3 can be designed to achieve rapid positioning and installation of the shutter and to ensure that during the process of replacing the shutter, overall optical path of lens 1 will not be affected. The operation is simple as well as convenient, which greatly improves work efficiency and reduces the cost of using the camera system for the aerial mapping. In addition, lens 1 adopts inter-lens shutter 3, which makes overall structure of the camera system compact, reliable, light in weight and small in volume, and solves problems of heavy weight as well as large size of camera due to incomplete camera modification and unstable operation on the drones in the prior art.

As shown in FIG. 1 and FIG. 2, lens 1 is fixedly connected to CMOS image sensor module 4, and DSP mainboard 5 is connected to CMOS image sensor module 4 via circuit board. Further, in a specific embodiment, DSP mainboard 5 can be fixed on CMOS image sensor module 4 by the screws to ensure stability of connection between the various components in the camera system for aerial mapping. In embodiments of present invention, lens 1 is used to collect image light signals, CMOS image sensor module 4 is used to capture image light signals and then convert image light signals into digital image signals. DSP mainboard 5 comprises DSP (Digital Signal Processor, the programmable microprocessor for processing of the digital signals) module 6, which can develop corresponding software system according to actual needs to realize the interaction and integration of camera with the drone and other integrated hardware. DSP mainboard 5 is electrically connected to inter-lens shutter 3, and the DSP mainboard 5 is used to receive and process digital image signals and adjust inter-lens shutter 3.

In a specific embodiment, lens 1 utilizes fixed-focus lens, and the circuit board connecting CMOS image sensor module 4 as well as DSP mainboard 5 utilizes the high-speed FPC (Flexible Printed Circuit), that is, special high-density multilayer circuit board has been utilized in present embodiment to connect CMOS image sensor module 4 and DSP mainboard 5, which has the good electromagnetic shielding, heat resistance as well as high-temperature resistance, and can meet the requirements of high-speed data transmission.

In embodiment of the present invention, as shown in FIG. 3, the camera system for aerial mapping further comprises driving signal module 7, and DSP mainboard 5 is electrically connected to inter-lens shutter 3 through driving signal module 7. Driving signal module 7 is used to control and process the input as well as output signals of DSP mainboard 5 as well as inter-lens shutter 3. In some embodiments, driving signal module 7 can be set outside DSP mainboard 5, and in other embodiments, driving signal module 7 can also be set inside DSP mainboard 5 to control the input as well as output signals of the electronic device or component, and control the timing, frequency as well as delay of the electronic device or component.

In one embodiment, as shown in FIG. 3, DSP mainboard 5 also comprises driving signal circuit module 8, storage module 9 and power management module 10, that is, DSP mainboard 5 is mainly integrated with DSP module 6, driving signal circuit module 8, storage module 9 as well as power management module 10 in a high degree. Among them, driving signal circuit module 8 is electrically connected to DSP module 6 and driving signal module 7 respectively, and is used to trigger the control processing of the signal according to the control signal sent by DSP module 6, and control signal output timing of driving signal module 7. In several embodiments, when driving signal module 7 is set inside DSP mainboard 5, driving signal module 7 can be directly connected to driving signal circuit module 8 of DSP mainboard 5 to better realize control management of the signal. In addition, driving signal module 7 can be electrically connected to other modules through SLVS-EC interface. The input end of storage module 9 is electrically connected to the output end of DSP module 6 and driving signal circuit module 8 respectively and is used to store and process the data signal processed by DSP module 6 and the control signal executed by driving signal circuit module 8 to achieve the storage control and the management of camera memory as well as output photos. Power management module 10 is electrically connected to DSP module 6, driving signal circuit module 8 and storage module 9 respectively and is used to control and process the electric current of input as well as output power of DSP mainboard 5.

In a specific embodiment, driving signal circuit module 8 comprises a camera power-on driving circuit and a photo-trigger driving circuit. The camera power-on driving circuit is used to drive camera to power on, and photo-trigger driving circuit is used to drive camera to trigger the signal to take photos.

Figure 4:
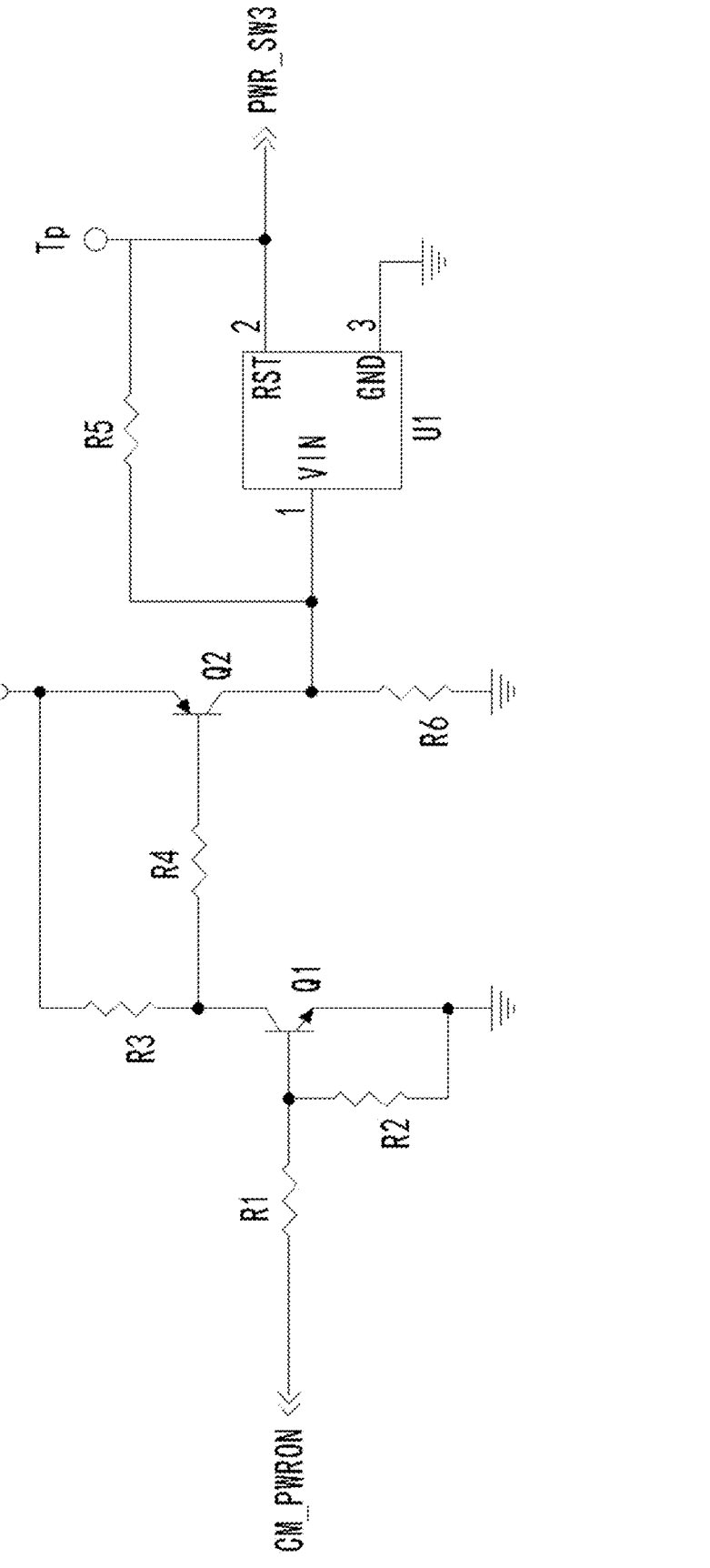
FIG. 4 shows a schematic diagram of the driving circuit of camera power-on in the camera system for aerial mapping provided by embodiments of the present invention.

In a specific implementation process, as shown in FIG. 4, camera power-on driving circuit comprises the chip U1, NPN transistor Q1, PNP transistor Q2, resistor R1, resistor R2, resistor R3, resistor R4, resistor R5 and resistor R6. Specifically, one end of resistor R1 is connected to camera power-on signal CM_PWRON, the other end of resistor R1 is respectively connected to one end of resistor R2 as well as the base b of NPN transistor Q1, and the collector c of NPN transistor Q1 is respectively connected to one end of resistor R3 and resistor R4, the other end of resistor R4 is connected to base b of PNP transistor Q2, the emitter e of PNP transistor Q2 is connected to other end of resistor R3, the collector c of PNP transistor Q2 is respectively connected to one end of the resistor R6 and the pin 1 of chip U1, the two ends of resistor R5 are respectively connected to pin 1 as well as pin 2 of chip U1, and the other end of resistor R2, emitter e of NPN transistor Q1, the other end of resistor R6 as well as pin 3 of chip U1 are grounded. Among them, resistor R1, resistor R2, resistor R4 and resistor R5 all play a major role in the current limiting, resistor R3 is a pull-up resistor, and its role is to prevent lower end components from floating when there is no signal, thus causing parasitic voltage, resistor R6 is a pull-down resistor, and its role is to prevent upper end components from floating when there is no signal, thus causing parasitic voltage, NPN transistor Q1 as well as PNP transistor Q2 have the same working principle, and are mainly used to control magnitude of the electric current. Further, in present embodiment, pin 1 of chip U1 is voltage input end VIN, pin 2 is reset end RST, pin 3 is ground point GND, and pin 2 of chip U1 is provided with interface Tp and connected to the signal PWR_SW3.

Figure 5:
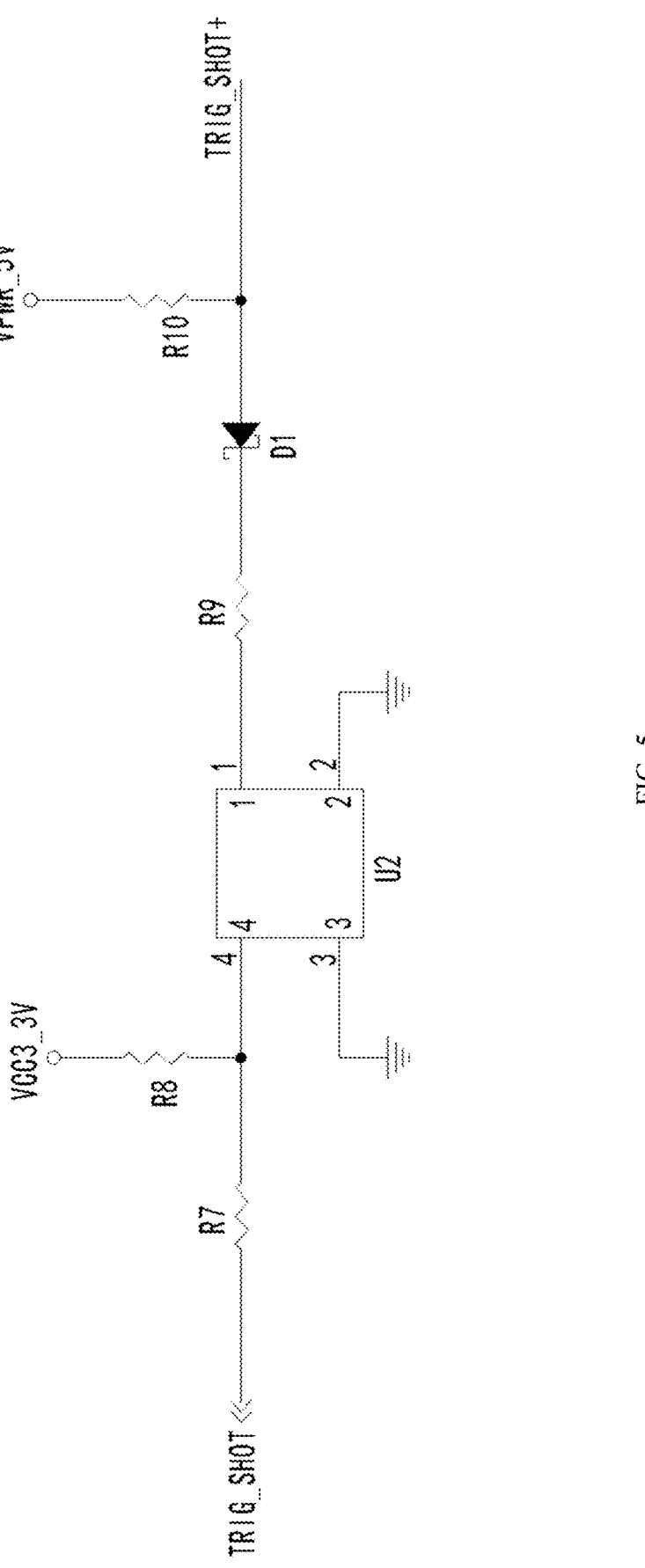
FIG. 5 shows a schematic diagram of the driving circuit of the photo-trigger in the camera system for aerial mapping provided by embodiments of the present invention.

As shown in FIG. 5, photo-trigger driving circuit comprises chip U2, diode D1, resistor R7, resistor R8, resistor R9 and resistor R10. Specifically, one end of the resistor R7 is connected to the trigger photo signal TRIG_SHOT, the other end of resistor R7 is respectively connected to one end of resistor R8 and the pin 4 of chip U2, the other end of resistor R8 is connected to power supply voltage VCC, pin 1 of chip U2 is connected to one end of the resistor R9, the other end of resistor R9 is connected to the negative electrode of diode D1, the positive electrode of diode D1 is connected to one end of the resistor R10, the other end of resistor R10 is connected to the input power supply VPWR, and the pin 2 as well as pin 3 of chip U2 are grounded. Among them, resistor R8 and resistor R10 are pull-up resistors, and their function is to prevent the lower end components from floating when there is no signal, thus causing parasitic voltage. The main function of resistor R7 and resistor R9 is to limit electric current to exceed maximum electric current of the component. The function of diode D1 is to stabilize the voltage which is stabilized by using the characteristic that the reverse voltage does not change with the reverse current within a certain range of reverse current after diode D1 is broken down reversely. Pin 1 of chip U2 is the output end, while pin 2 is the ground point GND, pin 3 is the ground point GND, and pin 4 is the input end.

Figure 6:
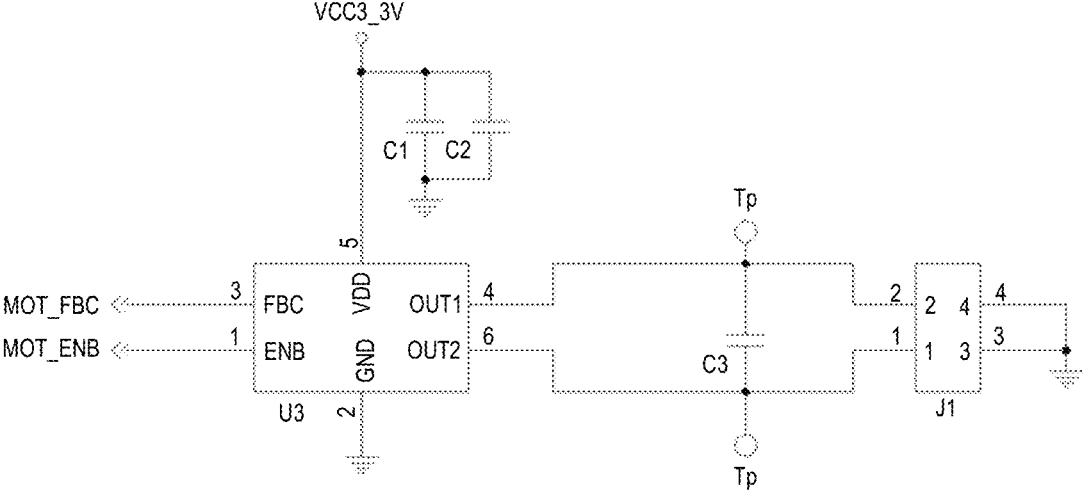
FIG. 6 shows a schematic diagram of the driving circuit of the infrared filter switch in the camera system for aerial mapping provided by embodiments of the present invention.

In another specific implementation process, driving signal circuit module 8 comprises the infrared filter switch driving circuit, as shown in FIG. 6, the infrared filter switch driving circuit comprises chip U3, chip J1, capacitor C1, capacitor C2 as well as capacitor C3, pin 5 of chip U3 is respectively connected to one end of the capacitor C1, one end of the capacitor C2 and the power supply voltage VCC, one end of the capacitor C3 is respectively connected to the pin 4 of chip U3 and the pin 2 of chip J1, the other end of capacitor C3 is respectively connected to pin 6 of chip U3 as well as pin 1 of chip J1, the pin 2 of chip U3, the other end of capacitor C1, the other end of capacitor C2 and the pin 3 as well as the pin 4 of chip J1 are grounded. Among them, capacitor C1, capacitor C2 and capacitor C3 mainly play the role of voltage stabilization. In addition, pin 1 of chip U3 is the B enable end ENB which connected to the signal MOT_ENB, pin 2 is the ground point GND, pin 3 is the input end FBC which connected to the signal MOT_FBC, pin 4 is the first output end OUT1, pin 5 is the power supply end VDD, pin 6 is the second output end OUT2, and interface Tp is set at two ends of capacitor C3. Pin 1 of chip J1 is the output end, pin 2 is the output end, pin 3 is the ground point GND, and pin 4 is the ground point GND.

Figure 7:
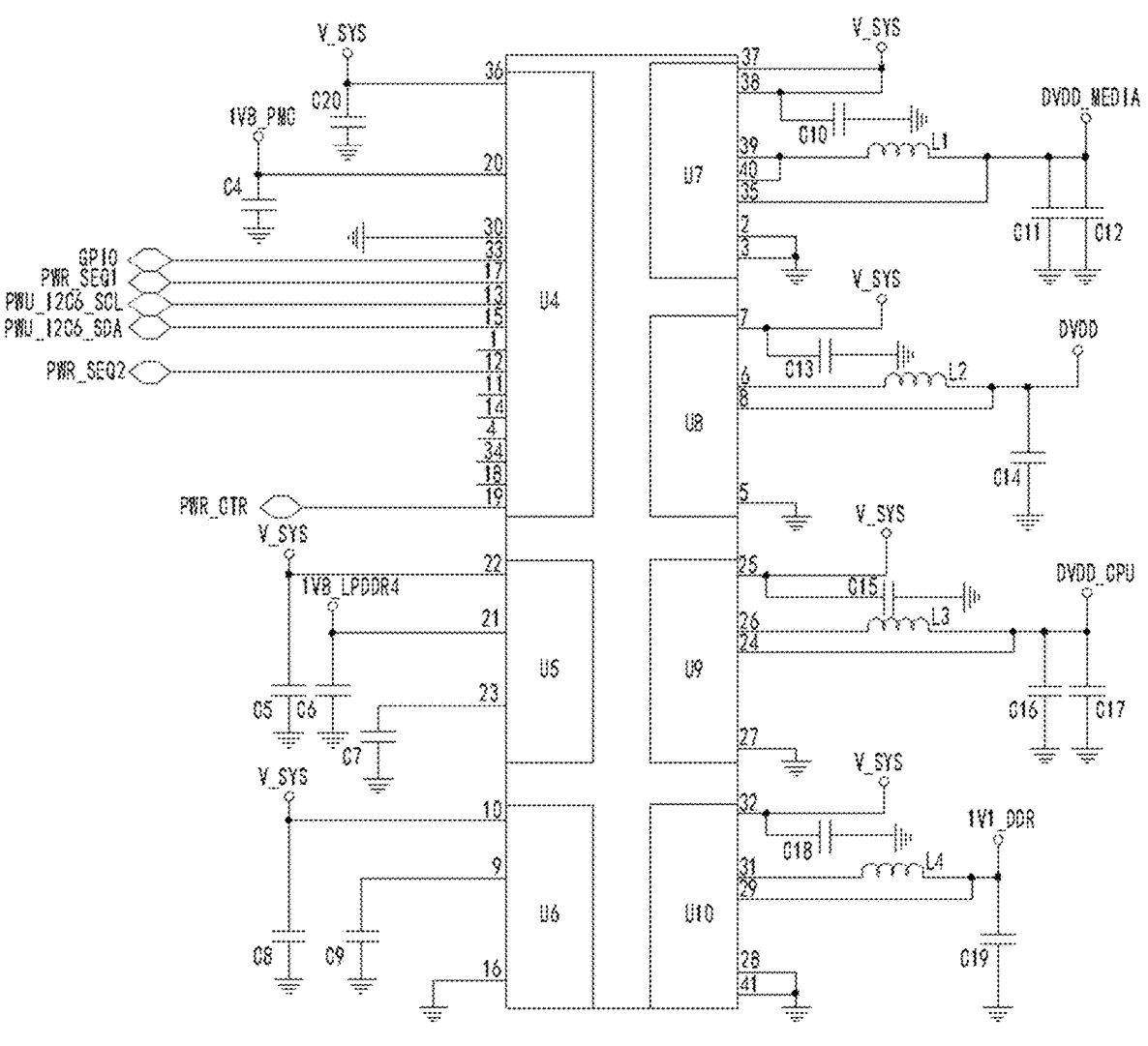
FIG. 7 shows a schematic diagram of the power management circuit in the camera system for aerial mapping provided by embodiments of the present invention.

In a specific embodiment, power management module 10 comprises a power management circuit. As shown in FIG. 7, power management circuit further comprises chip U4, chip U5, chip U6, chip U7, chip U8, chip U9, chip U10, capacitor C4, capacitor C5, capacitor C6, capacitor C7, capacitor C8, capacitor C9, capacitor C10, capacitor C11, capacitor C12, capacitor C13, capacitor C14, capacitor C15, capacitor C16, capacitor C17, capacitor C18, capacitor C19, capacitor C20, inductor L1, inductor L2, inductor L3 and inductor LA.

Among them, chip U4, capacitor C4 and capacitor C20 together constitute power control circuit which is responsible for controlling the power supply to enter sleep, standby and other states. Specifically, chip U4 is provided with the GPIO port, and may also be provided with one or more ports of PWR_SEQ1 port, PWU_I2C6_SCL port, PWU_I2C6_SDA port, PWR_SEQ2 port and PWR_CTR port. Pin 36 of chip U4 is connected respectively to system power supply V_SYS and one end of capacitor C20, and the pin 20 of chip U4 is connected respectively to the power supply 1V8_PMC and one end of capacitor C4, and the other ends of capacitor C20 as well as capacitor C4 and pin 30 of chip U4 are grounded. Pin 36 of chip U4 is the V_SYS system power supply end, pin 20 is the 1V8_PMC power supply end, and pin 30 is the ground point GND.

Chip U5, capacitor C5, capacitor C6 as well as capacitor C7 together constitute stabilized DC power supply circuit which is used in supply circuit for voltage and current stabilization when using the switch mode power supply. Specifically, pin 22 of chip U5 is connected to system power supply V_SYS and one end of capacitor C5 respectively, pin 21 of chip U5 is connected to power supply 1V8_LPDDR4 and one end of capacitor C6, pin 23 of chip U5 is connected to one end of capacitor C7, and the other ends of capacitors C5, C6 as well as C7 are grounded. Pin 22 of chip U5 is V_SYS system power supply end, pin 21 is 1V8_LPDDR4 power supply end, and pin 23 is output end.

Chip U6, capacitor C8 as well as capacitor C9 together constitute the stabilized DC power supply circuit which is used in supply circuit for voltage as well as current stabilization when using switch mode power supply. Specifically, pin 10 of chip U6 is connected to system power supply V_SYS and one end of the capacitor C8 respectively, pin 9 of chip U6 is connected to one end of capacitor C9, and the other ends of capacitors C8 as well as C9 and pin 16 of chip U6 are grounded. The pin 10 of chip U6 is the V_SYS system power supply end, pin 9 is the output end, and pin 16 is the ground point GND.

In the prior art, efficiency of switching voltage regulator is very high, but the output ripple voltage is also high, the noise is large, and the voltage regulation rate as well as other performance are also very poor, especially when the analog circuit is powered, it will have a greater impact. In the present embodiment, by connecting a low dropout voltage regulator to output end of switching voltage regulator, the active power filtering can be effectively realized, and the voltage regulation accuracy of the output voltage can be greatly improved, and the efficiency of power supply system will not be significantly reduced.

Chip U7, capacitor C10, capacitor C11, capacitor C12 and inductor L1 together constitute circuit for voltage and current stabilization when using the switch mode power supply, which plays the role of voltage and current stabilization. Specifically, pins 37 and 38 of chip U7 are respectively connected to system power supply V_SYS, pin 38 of chip U7 is connected to one end of capacitor C10, pins 39 and 40 of chip U7 are respectively connected to one end of inductor L1, and the other end of inductor L1 is respectively connected to pin 35 of chip U7, digital voltage DVDD_MEDIA and one end of the capacitor C11 as well as the capacitor C12, and the other ends of capacitor C10, capacitor C11, capacitor C12 and pin 2 as well as pin 3 of the chip U7 are grounded. Among them, pin 37 of chip U7 is V_SYS system power supply end, pin 38 is V_SYS system power supply end, pin 39 is input end, pin 40 is input end, pin 35 is DVDD_MEDIA digital voltage end, pin 2 is the ground point GND, and pin 3 is the ground point GND. During operation, the input voltage charges inductor L1, and at the same time charges the capacitors C11 and C12. During this process, energy is stored in capacitors C11, C12 and inductor L1. When input voltage stops supplying power, the energy stored in inductor L1 is discharged. When output voltage is about to drop, the energy in the capacitors C11 and C12 is discharged to maintain the output voltage unchanged, thereby achieving the purpose of voltage and current stabilization.

Chip U8, capacitor C13, capacitor C14 as well as inductor L2 together constitute circuit for voltage as well as current stabilization when using the switch mode power supply, which plays the role of voltage and current stabilization. Specifically, pin 7 of chip U8 is respectively connected to the system power supply V_SYS and one end of capacitor C13, pin 6 of chip U8 is connected to one end of inductor L2, and the other end of inductor L2 is respectively connected to pin 8 of chip U8, digital voltage DVDD is connected to one end of capacitor C14, and the other ends of capacitor C13 as well as capacitor C14 and the pin 5 of chip U8 are grounded. Among them, pin 7 of chip U8 is V_SYS system power supply end, pin 6 is input end, pin 8 is DVDD digital voltage end, and pin 5 is ground point GND. During operation, input voltage charges inductor L2, and at same time charges the capacitor C14. During this process, energy is stored in capacitor C14 and inductor L2. When input voltage stops supplying power, energy stored in inductor L2 is discharged. When the output voltage is about to drop, the energy in capacitor C14 is discharged to maintain the output voltage unchanged, thereby achieving the purpose of voltage and current stabilization.

Chip U9, capacitor C15, capacitor C16, capacitor C17 and inductor L3 together constitute circuit for voltage as well as current stabilization when using the switch mode power supply, which plays the role of voltage and current stabilization. Specifically, the pin 25 of chip U9 is respectively connected to the system power supply V_SYS and one end of capacitor C15, pin 26 of chip U9 is connected to one end of inductor L3, the other end of inductor L3 is respectively connected to pin 24 of chip U9, digital voltage DVDD_CPU and one end of capacitor C16 as well as capacitor C17, the other end of capacitor C15, capacitor C16, capacitor C17 and pin 27 of chip U9 are connected. Among them, pin 25 of chip U9 is V_SYS system power supply end, pin 26 is input end, pin 24 is DVDD_CPU digital voltage end, and pin 27 is ground point GND. During the operation, input voltage charges inductor L3, and at the same time charges capacitor C16 as well as capacitor C17. In this process, energy is stored in capacitors C16, C17 as well as inductor L3. When input voltage stops supplying power, the energy stored in inductor L3 is discharged. When the output voltage is about to drop, energy in capacitor C16 and capacitor C17 is discharged to maintain output voltage unchanged, thereby achieving the purpose of voltage and current stabilization.

Chip U10, capacitor C18, capacitor C19 and inductor L4 also together constitute circuit for voltage and current stabilization when using switch mode power supply, which plays the role of voltage and current stabilization. Specifically, pin 32 of chip U10 is respectively connected to the system power supply V_SYS and one end of capacitor C18, pin 31 of chip U10 is connected to one end of inductor LA, and the other end of inductor L4 is respectively connected to pin 29 of chip U10, power supply 1V1_DDR and one end of capacitor C19, and the other ends of capacitor C18 as well as capacitor C19 and pin 28 as well as pin 41 of chip U10 are grounded. Among them, pin 32 of chip U10 is V_SYS system power supply end, pin 31 is input end, pin 29 is the 1V1_DDR power supply end, pin 28 is ground point GND, and pin 41 is ground point GND. During operation, input voltage charges inductor L4 and at the same time charges capacitor C19. During this process, the energy is stored in capacitor C19 as well as inductor L4. When input voltage stops supplying power, energy stored in inductor L4 is discharged. When the output voltage is about to drop, energy in capacitor C19 is discharged to maintain output voltage unchanged, thereby achieving purpose of voltage and current stabilization.

Figure 8:
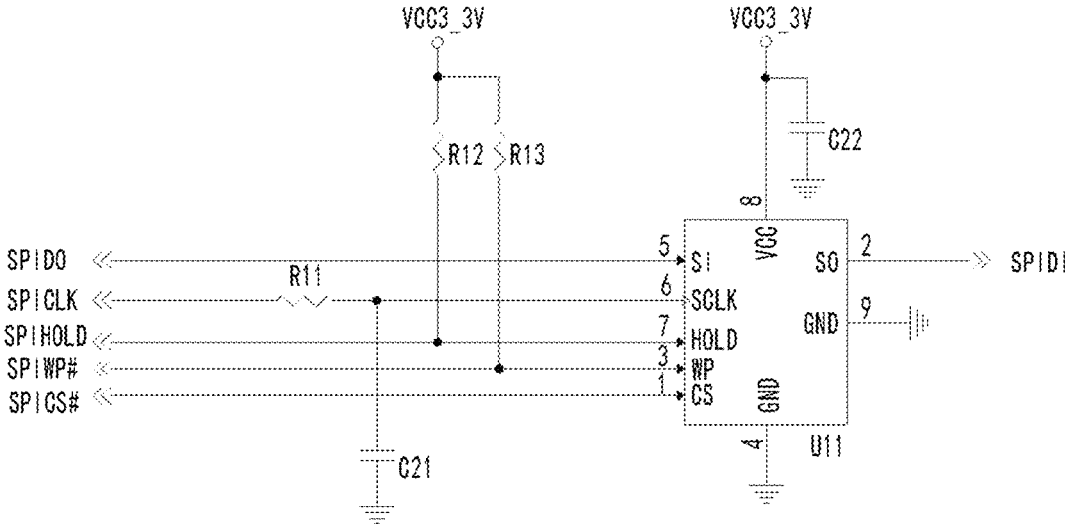
FIG. 8 shows a schematic diagram of the Flash storage circuit in the camera system for aerial mapping provided by embodiments of the present invention.

In a specific embodiment, storage module 9 comprises Flash storage circuit and SD card storage circuit. Specifically, as shown in FIG. 8, Flash storage circuit comprises chip U11, resistor R11, resistor R12, resistor R13, capacitor C21 and capacitor C22, pin 8 of chip U11 is connected to the power supply voltage VCC and one end of capacitor C22 respectively, the pin 6 of chip U11 is connected in series with resistor R11, and pin 6 of chip U11 is connected to one end of capacitor C21, pin 7 of chip U11 is connected to one end of resistor R12, pin 3 of chip U11 is connected to one end of resistor R13, the other ends of resistor R12 and resistor R13 are connected to the power supply voltage VCC respectively, and the other ends of the capacitor C21 as well as capacitor C22 and the pin 4 of chip U11 are grounded. Among them, resistor R12 and resistor R13 are both pull-up resistors to prevent the components at the lower end from floating when there is no signal and thus causing parasitic voltage, the resistor R11 mainly acts as a jumper, and capacitor C21 as well as capacitor C22 mainly act as a voltage stabilizer. In addition, in the present embodiment, pin 1 of chip U11 is chip selection end CS, connected to signal SPICS #, and used to control the working status of chip. When external device sends CS signal, the chip is in working status. Pin 2 of chip U11 is serial output end SO, connected to signal SPIDI, and used to send out internal data. Pin 3 of chip U11 is write protection end WP, connected to signal SPIWP #, and used to prevent external devices from reading and writing data inside the chip. Pin 4 as well as pin 9 of chip U11 are both ground point GND. Pin 5 of chip U11 is serial input end SI, connected to signal SPIDO, and used to receive data sent by external device. Pin 6 of chip U11 is serial clock end SCLK, connected to signal SPICLK, and used to control timing of data transmission. Pin 7 of chip U11 is control input end HOLD, connected to signal SPIHOLD, and used to suspend data transmission. When external device sends HOLD signal, the chip suspends data transmission. Pin 8 of chip U11 is power supply voltage end VCC.

Figure 9:
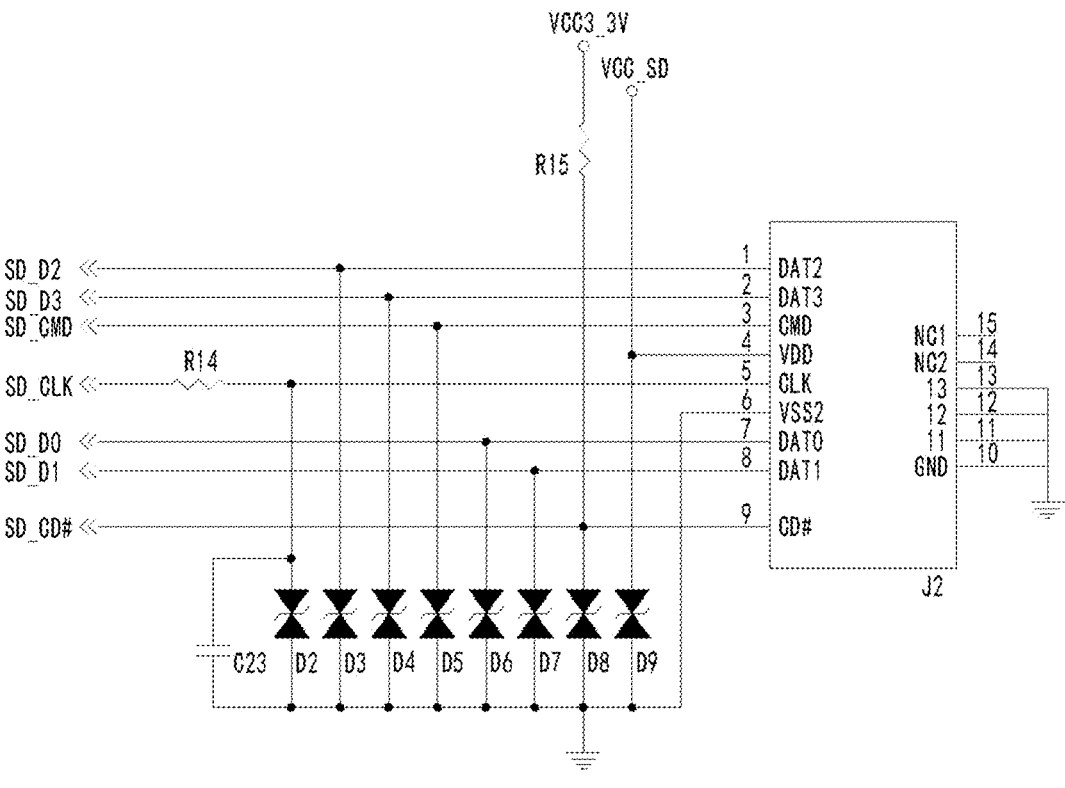
FIG. 9 shows a schematic diagram of the SD card storage circuit in the camera system for aerial mapping provided by embodiments of the present invention.

As shown in FIG. 9, the SD card storage circuit comprises chip J2, resistor R14, resistor R15, capacitor C23, diode D2, diode D3, diode D4, diode D5, diode D6, diode D7, diode D8 and diode D9. Pin 5 of chip J2 is connected in series with resistor R14, one end of the resistor R15 is connected to the power supply voltage VCC, the other end of resistor R15 is connected to pin 9 of chip J2, pin 4 of chip J2 is connected to power supply VCC_SD, capacitor C23 is connected in series with diode D2, one end of diode D2 is connected to pin 5 of chip J2, one end of diode D3 is connected to pin 1 of chip J2, one end of diode D4 is connected to pin 2 of chip J2, one end of the diode D5 is connected to pin 3 of chip J2, one end of diode D6 is connected to pin 7 of chip J2, one end of diode D7 is connected to pin 8 of chip J2, one end of diode D8 is connected to pin 9 of chip J2, one end of diode D9 is connected to pin 4 of chip J2, and pins 6, 10, 11, 12 as well as 13 of chip J2 and the other ends of diodes D2, D3, D4, D5, D6, D7, D8, as well as D9 are connected. Among them, capacitor C23 mainly plays a role of voltage stabilization, resistor R14 mainly plays a role of the jumper, resistor R15 is pull-up resistor to prevent components at the lower end from floating when there is no signal and thus causing parasitic voltage, and the diodes D2, D3, D4, D5, D6, D7, D8, as well as D9 all act as anti-static agent. In addition, in the present embodiment, pin 1 of chip J2 is second data end DAT2, connected to signal SD_D2, and used to transmit instructions as well as data. Pin 2 of chip J2 is third data end DAT3, connected to signal SD_D3, and used to transmit instructions as well as data. Pin 3 of chip J2 is command end CMD, connected to signal SD_CMD, and used to send as well as receive the command. Pin 4 of chip J2 is power supply end VDD. Pin 5 of chip J2 is clock end CLK, connected to signal SD_CLK, and used to synchronize data transmission. Pin 6 of chip J2 is common ground voltage end VSS2. Pin 7 of chip J2 is zeroth data end DAT0, connected to signal SD_D0, and used to transmit instructions as well as data. Pin 8 of chip J2 is first data end DAT1, connected to signal SD_D1, and used to transmit instructions as well as data. Pin 9 of chip J2 is CD #end, connected to signal SD_CD #. Pins 10, 11, 12, and 13 of chip J2 are ground point GND. Pin 14 of chip J2 is NC2 (second signal end), used to receive or send the undefined signal. Pin 15 of chip J2 is NC1 (first signal end), used to receive or send the undefined signal.

In an embodiment, as shown in FIG. 3, DSP mainboard 5 also comprises communication module 14, which is electrically connected to the input ends of DSP module 6, power management module 10 and storage module 9 respectively, and is used for the communication function of DSP module 6. Specifically, communication module 14 is used to connect to the network to achieve the transmission of information such as pictures, video streams, control signals, and data between DSP module 6. Communication module 14 is electrically connected to the input end of storage module 9 to store the information transmitted by communication module 14 in storage module 9. In several specific embodiments, communication module 14 is provided with two external interfaces MDIP and MDIN, i.e., the export and import of the Media Dependent Interface.

In the embodiment of the present invention, as shown in FIG. 3, DSP module 6 comprises information statistics module 11, scene recognition module 12 as well as data processing module 13. The output end of CMOS image sensor module 4 is connected to input end of scene recognition module 12. CMOS image sensor module 4 is responsible for collecting data, converting the optical signal into digital signal and sending it to scene recognition module 12. Scene recognition module 12 is used to receive the digital image signal sent by CMOS image sensor module 4, perform scene recognition according to the digital image signal, and adjust system parameters according to the recognized scene information to improve system performance. Input end of information statistics module 11 is connected to output end of scene recognition module 12. The information statistics module 11 is used to collect, count and analyze data information of scene recognition module 12 to improve the system performance, wherein the data information includes the digital image signal, the scene information as well as the adjusted system parameters. The input end of data processing module 13 is connected to the output end of information statistics module 11. The data processing module 13 is used to receive the sensor data of CMOS image sensor module 4 as well as statistical information sent by information statistics module 11 and run the program according to sensor data and statistical information to adjust inter-lens shutter 3 and realize the functions of photographing, signal control and storage management of lens 1. Further, in embodiments of the present invention, DSP module 6 can also provide the software development kit SDK. The SDK software system can use DSP mainboard 5 to realize various complex control applications, thereby realizing interaction and integration of the camera with the drone and other integrated hardware.

In one embodiment, DSP module 6 is provided with one or more of the LCD interfaces, Peripheral interfaces, JTAG interfaces, TV interfaces as well as HDMI interfaces, wherein LCD interface is used to connect to the display screen, Peripheral interface includes GPIO port and can further be used for multiplex PWM, CTS, RTS, etc., JTAG interface is used for internal testing of DSP chip, TV interface is used for connecting to TV, and HDMI interface is used for connection between computer and peripherals such as TV and projector, unifying audio, video and data signals together, so that the camera system for aerial mapping can be connected to audio-visual devices in a simple, reliable and high-definition manner.

The above is an introduction to various components of camera system for aerial mapping provided in the present embodiment and the connections between them. The following is a detailed description of photographing principle of camera system for aerial mapping in conjunction with drawings from FIG. 1 to FIG. 9.

In embodiments of present invention, light enters the camera through lens 1, and through inter-lens shutter 3 controlled by DSP module 6, the high-speed moving objects can be effectively photographed without deformation and without restrictions when using camera flashlight, which solves the problem of jelly effect produced when the drone takes photos in motion in the prior art. Finally, the light reaches CMOS image sensor module 4, which can convert image light signal into the electrical signal. After that, the generated electrical signal is converted into digital image signal via ADC circuit and transmitted to DSP mainboard 5 for processing. Among them, DSP module 6 can be developed and designed by engineers according to user requirements, and SDK software system is provided to conduct the image processing on the RAW data such as de-noise, automatic exposure, gamma correction, etc. In addition to processing images itself, DSP module 6 may also comprise network, Bluetooth, GPS, etc. to facilitate the subsequent upgrades and applications, and further realize interaction and integration of camera with the drone and other integrated hardware.

In summary, the present description discloses camera system for aerial mapping that uses an inter-lens shutter and possesses compact as well as reliable structure. Its overall system is light in weight and small in volume. The system is equipped with a DSP module, and software system can be developed according to actual requirements to achieve interaction and integration between cameras as well as drones and other integrated hardware. The system possesses strong applicability and a wide range of applications.

Those skilled in prior art can comprehend that the modules within the device described in the present embodiments can be distributed within this device described in present embodiments according to the description of present embodiments or can be varied accordingly and located in one or more devices different from present embodiments. The modules in above embodiments can be combined into one module or can be further divided into multiple sub-modules.

It should be noted that similar numbers and letters represent similar items in the following drawings. Therefore, once an item is defined in one drawing, it is not required to be further defined as well as explained in the subsequent drawings. Further, terms such as "mount", "connect", "link" and the like should be interpreted in a broad sense. For example, it may be a fixed connection, a detectable connection or integration; it may be a mechanical connection or an electric connection; or it may be a direct connection, an indirect connection by means of an intermediate, an internal interconnection of two elements or an interaction of two elements. For those of ordinary skill in the prior art, the specific meanings of the above terms in the present invention can be understood according to specific contexts.

Finally, it should be noted that above embodiments are only used to illustrate the technical solutions of the present invention and not to limit them. Although the present invention is described in detail with reference to above embodiments, ordinary technicians in this field should understand that they can still modify the technical solutions recorded in above embodiments or replace some technical features therein with equivalents. However, these modifications or replacements do not deviate the essence of corresponding technical solutions from the spirit and scope of the technical solutions of the embodiments of the present invention.

What is claimed is:

1. A camera system for aerial mapping, comprising:
a lens for collecting the image light signals, wherein a shutter slot is provided on the lens barrel of the lens,
an inter-lens shutter, wherein the inter-lens shutter is inserted and fixed in the shutter slot,
a CMOS image sensor module, wherein the CMOS image sensor module is connected fixedly to the lens, and is used to capture image light signal and convert the image light signal into a digital image signal,
a DSP mainboard, wherein the DSP mainboard comprises a DSP module, wherein DSP mainboard is connected to CMOS image sensor module via a circuit board, and DSP mainboard is electrically connected to the inter-lens shutter and is used to receive as well as process the digital image signal and regulate the inter-lens shutter,
a driving signal module,
wherein the DSP mainboard is electrically connected to inter-lens shutter through the driving signal module,
wherein the driving signal module is used to control and process input as well as output signals of the DSP mainboard and the inter-lens shutter,
wherein the DSP module includes an information statistics module, a scene recognition module and a data processing module,
wherein the output end of the CMOS image sensor module is connected to the input end of the scene recognition module,
wherein the scene recognition module is used to receive the digital image signal sent by CMOS image sensor module, perform scene recognition according to digital image signal, and adjust system parameters according to recognized scene information,
wherein the input end of the information statistics module is connected to the output end of scene recognition module,
wherein the information statistics module is used to collect, count and analyze data information of the scene recognition module,
wherein data information includes digital image signal, scene information and adjusted system parameters,
wherein input end of the data processing module is connected to output end of information statistics module,
wherein the data processing module is used to receive the sensor data of the CMOS image sensor module as well as statistical information sent by information statistics module, and run a program according to sensor data and statistical information to adjust the inter-lens shutter and realize photographing, signal control and storage management functions of the lens.

2. The camera system for aerial mapping according to claim 1, wherein DSP mainboard comprises a driving signal circuit module, a storage module and a power management module, wherein
the driving signal circuit module is electrically connected to driving signal module as well as DSP module respectively and is used for triggering the control processing of the signal according to the control signal sent by DSP module, and controlling signal output timing of driving signal module, wherein the input end of the storage module is electrically connected to the output end of the DSP module and the driving signal circuit module respectively, and is used to store and process the data signal processed by DSP module as well as control signal executed by the driving signal circuit module, and wherein
the power management module is electrically connected to the DSP module, the storage module as well as the driving signal circuit module respectively and is used to control and process electric current of the input as well as output power of the DSP mainboard.

3. The camera system for aerial mapping according to claim 2, wherein the driving signal circuit module comprises a camera power-on driving circuit and a photo-trigger driving circuit, wherein
the camera power-on driving circuit comprises a chip U1, an NPN transistor Q1, a PNP transistor Q2, a resistor R1, a resistor R2, a resistor R3, a resistor R4, a resistor R5 and a resistor R6, wherein one end of resistor R1 is connected to camera power-on signal, wherein the other end of resistor R1 is respectively connected to one end of resistor R2 and the base b of NPN transistor Q1, wherein the collector c of the NPN transistor Q1 is respectively connected to one end of the resistor R3 and one end of the resistor R4, wherein the other end of resistor R4 is connected to the base b of the PNP transistor Q2, wherein the emitter e of PNP transistor Q2 is connected to the other end of the resistor R3, wherein the collector c of the PNP transistor Q2 is respectively connected to one end of resistor R6 and the pin 1 of chip U1, wherein both ends of resistor R5 are respectively connected to pin 1 and pin 2 of chip U1, wherein the other end of resistor R2, the emitter e of NPN transistor Q1, the other end of resistor R6 as well as the pin 3 of chip U1 are grounded, wherein
the photo-trigger driving circuit comprises a chip U2, a diode D1, a resistor R7, a resistor R8, a resistor R9 and a resistor R10, wherein one end of the resistor R7 is connected to the photo-trigger signal, wherein the other end of the resistor R7 is respectively connected to one end of the resistor R8 and the pin 4 of the chip U2, wherein the other end of resistor R8 is connected to power supply voltage VCC, wherein the pin 1 of the chip U2 is connected to one end of the resistor R9, wherein the other end of the resistor R9 is connected to the negative electrode of the diode D1, wherein the positive electrode of the diode D1 is connected to one end of resistor R10, wherein the other end of the resistor R10 is connected to the input power supply VPWR, and wherein the pin 2 as well as pin 3 of the chip U2 are grounded.

4. The camera system for aerial mapping according to claim 3, wherein the driving signal circuit module comprises an infrared filter switch driving circuit which further comprises a chip U3, a chip J1, a capacitor C1, a capacitor C2 as well as a capacitor C3, wherein the pin 5 of chip U3 is respectively connected to one end of capacitor C1, one end of capacitor C2 and the power supply voltage VCC, wherein one end of capacitor C3 is respectively connected to the pin 4 of chip U3 and the pin 2 of chip J1, wherein the other end of capacitor C3 is respectively connected to the pin 6 of chip U3 and the pin 1 of chip J1, and wherein the pin 2 of chip U3, the other end of capacitor C1, the other end of capacitor C2 and pin 3 as well as pin 4 of chip J1 are grounded.

5. The camera system for the aerial mapping according to claim 2, wherein the power management module comprises power management circuit which further comprises a chip U4, a chip U5, a chip U6, a chip U7, a chip U8, chip U9, a chip U10, a capacitor C4, a capacitor C5, a capacitor C6, a capacitor C7, a capacitor C8, a capacitor C9, a capacitor C10, a capacitor C11, a capacitor C12, a capacitor C13, a capacitor C14, a capacitor C15, a capacitor C16, a capacitor C17, a capacitor C18, a capacitor C19, a capacitor C20, an inductor L1, an inductor L2, an inductor L3 and an inductor LA, wherein the chip U4 is provided with a GPIO port, wherein the pin 36 of chip U4 is respectively connected to the system power supply V_SYS and one end of the capacitor C20, wherein the pin 20 of chip U4 is respectively connected to power supply 1V8_PMC and one end of the capacitor C4, wherein the other end of capacitor C20 as well as capacitor C4 and the pin 30 of chip U4 are grounded, wherein the pin 22 of chip U5 is connected to the system power supply V_SYS and one end of the capacitor C5 respectively, wherein pin 21 of chip U5 is connected to power supply 1V8_LPDDR4 and one end of the capacitor C6 respectively, wherein the pin 23 of chip U5 is connected to one end of the capacitor C7, wherein the other end of the capacitors C5, C6 and C7 are grounded, wherein the pin 10 of chip U6 is respectively connected to the system power supply V_SYS and one end of the capacitor C8, wherein the pin 9 of chip U6 is connected to one end of capacitor C9, wherein the other end of capacitors C8, C9 and the pin 16 of chip U6 are grounded, wherein the pin 37 and the pin 38 of chip U7 are respectively connected to the system power supply V_SYS, wherein pin 38 of chip U7 is connected to one end of the capacitor C10, wherein the pin 39 and the pin 40 of chip U7 are respectively connected to one end of the inductor L1, wherein the other end of the inductor L1 is respectively connected to the pin 35 of the chip U7, the digital voltage DVDD_MEDIA and one end of the capacitor C11 as well as capacitor C12, wherein the other end of capacitors C10, C11, C12 and pin 2 as well as pin 3 of chip U7 are grounded, wherein pin 7 of chip U8 is respectively connected to the system power supply V_SYS and one end of the capacitor C13, wherein pin 6 of chip U8 is connected to one end of the inductor L2, wherein the other end of inductor L2 is respectively connected to pin 8 of chip U8, digital voltage DVDD and one end of the capacitor C14, wherein the other end of capacitors C13, C14 and pin 5 of chip U8 are grounded, wherein pin 25 of chip U9 is respectively connected to the system power supply V_SYS and one end of the capacitor C15, wherein pin 26 of chip U9 is connected to one end of the inductor L3, wherein the other end of inductor L3 is respectively connected to the pin 24 of chip U9, the digital voltage DVDD_CPU and one end of the capacitors C16 as well as C17, wherein the other end of capacitors C15, C16 and C17 are connected to the pin 27 of chip U9, wherein pin 32 of chip U10 is respectively connected to the system power supply V_SYS and one end of the capacitor C18, wherein pin 31 of chip U10 is connected to one end of the inductor LA, wherein the other end of inductor LA is respectively connected to the pin 29 of chip U10, the power supply 1V1_DDR and one end of the capacitor C19, and wherein the other end of capacitors C18 as well as C19 and the pins 28 as well as 41 of chip U10 are grounded.

6. The camera system for aerial mapping according to claim 2, wherein storage module comprises a Flash storage circuit as well as a SD card storage circuit, wherein Flash storage circuit further comprises a chip U11, a resistor R11, a resistor R12, a resistor R13, a capacitor C21 and a capacitor C22, wherein pin 8 of chip U11 is respectively connected to power supply voltage VCC and one end of the capacitor C22, wherein the pin 6 of chip U11 is connected in series with the resistor R11, and the pin 6 of chip U11 is connected to one end of the capacitor C21, wherein the pin 7 of chip U11 is connected to one end of the resistor R12, wherein the pin 3 of chip U11 is connected to one end of the resistor R13, wherein the other end of resistors R12 and R13 are respectively connected to power supply voltage VCC, wherein the other ends of capacitors C21 as well as C22 and the pin 4 of chip U11 are grounded, wherein SD card storage circuit further comprises a chip J2, a resistor R14, a resistor R15, a capacitor C23, a diode D2, a diode D3, a diode D4, a diode D5, a diode D6, a diode D7, a diode D8 and a diode D9, wherein the pin 5 of chip J2 is connected in series with resistor R14, wherein one end of the resistor R15 is connected to power supply voltage VCC, wherein the other end of resistor R15 is connected to pin 9 of chip J2, wherein the pin 4 of chip J2 is connected to power supply VCC_SD, wherein the capacitor C23 is connected in series with the diode D2, wherein one end of the diode D2 is connected to the pin 5 of chip J2, wherein one end of the diode D3 is connected to the pin 1 of chip J2, wherein one end of the diode D4 is connected to the pin 2 of chip J2, wherein one end of the diode D5 is connected to the pin 3 of chip J2, wherein one end of the diode D6 is connected to pin 7 of chip J2, wherein one end of the diode D7 is connected to the pin 8 of chip J2, wherein one end of the diode D8 is connected to pin 9 of the chip J2, wherein one end of the diode D9 is connected to the pin 4 of chip J2, and wherein pin 6, pin 10, pin 11, pin 12 as well as pin 13 of the chip J2 and the other ends of diode D2, diode D3, diode D4, diode D5, diode D6, diode D7, diode D8, as well as diode D9 are connected.

7. The camera system for aerial mapping according to claim 2, wherein the DSP mainboard further comprises a communication module, wherein the communication module is electrically connected to the input end of DSP module, power management module as well as storage module respectively and is used for communicating function of DSP module.

8. The camera system for the aerial mapping according to claim 1, wherein the DSP module further comprises a software development kit SDK, wherein the DSP module is provided with one or more interfaces within the LCD interface, Peripheral interface, JTAG interface, TV interface and HDMI interface.

* * * * *